United States Patent [19]

Dubicki

[11] 4,343,295
[45] Aug. 10, 1982

[54] SOLAR ENERGY SYSTEM

[76] Inventor: Robert Dubicki, 240 Cianci Rd., New Britain, Conn. 06053

[21] Appl. No.: 240,627

[22] Filed: Mar. 5, 1981

[51] Int. Cl.³ .................................................. F24J 3/02
[52] U.S. Cl. .................................... 126/425; 126/437; 126/440; 126/449
[58] Field of Search ............... 126/417, 424, 425, 430, 126/436, 437, 449, 450, 400, 440; 165/185

[56] References Cited

U.S. PATENT DOCUMENTS

| | | | |
|---|---|---|---|
| 1,683,266 | 9/1928 | Shipman | 126/424 |
| 1,951,403 | 3/1934 | Goddard | 126/440 |
| 2,902,028 | 9/1959 | Manly | 126/424 |
| 3,985,118 | 10/1976 | Bard | 126/440 |
| 4,019,494 | 4/1977 | Safdari | 126/449 |
| 4,068,474 | 1/1978 | Dimitroff | 126/440 |
| 4,069,812 | 1/1978 | O'Neill | 126/440 |
| 4,108,156 | 3/1977 | Sitter | 126/418 |
| 4,114,593 | 9/1978 | Guertin | 126/449 |
| 4,188,941 | 2/1980 | Hopkins | 126/449 |
| 4,276,122 | 6/1981 | Snyder | 126/425 |

*Primary Examiner*—Daniel J. O'Connor
*Attorney, Agent, or Firm*—McCormick, Paulding & Huber

[57] ABSTRACT

A solar energy system including a storage tank, a heat conductive top, and elements extending into the tank for conduction of heat energy. The invention also discloses lens focusing means and tracking elements located on top of said tank.

2 Claims, 3 Drawing Figures

SOLAR ENERGY SYSTEM

This invention relates generally to solar energy systems and deals more particularly with such a system having fluid storage means and adjacent means for focusing solar energy directly on the top of the container or tank for storing the heat retaining fluid.

The general object of the present invention is to provide an improved solar heating system wherein the heat is stored in a fluid within a storage tank located in relatively close relationship to the means for focusing solar energy, such energy being focused continuously onto the top of the container for the storage of such fluid, and the top of improved means for transferring the heat energy to the fluid.

Figure 1:
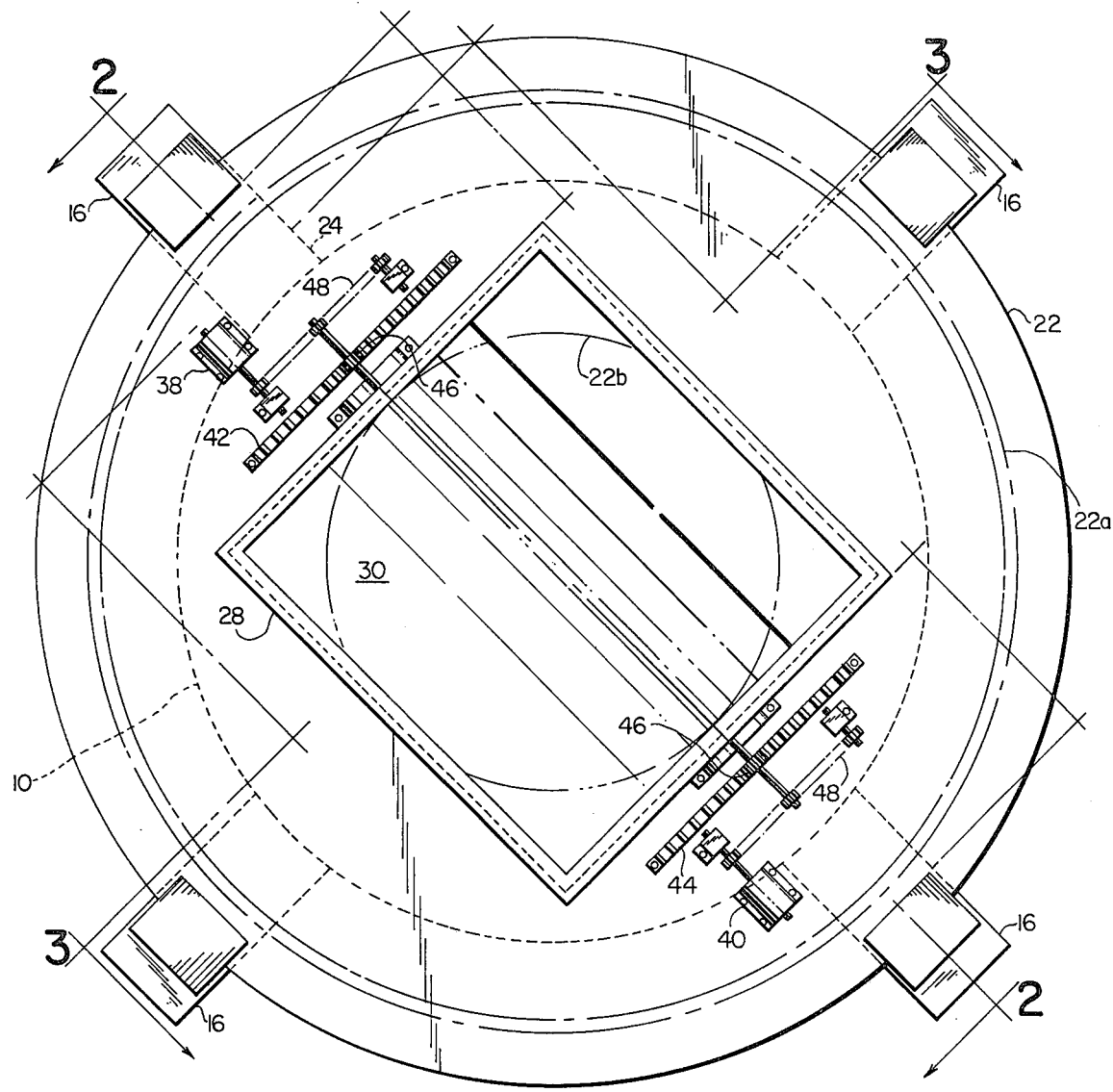
FIG. 1 is a top plan view of a solar energy system incorporating the present invention.
Figure 2:
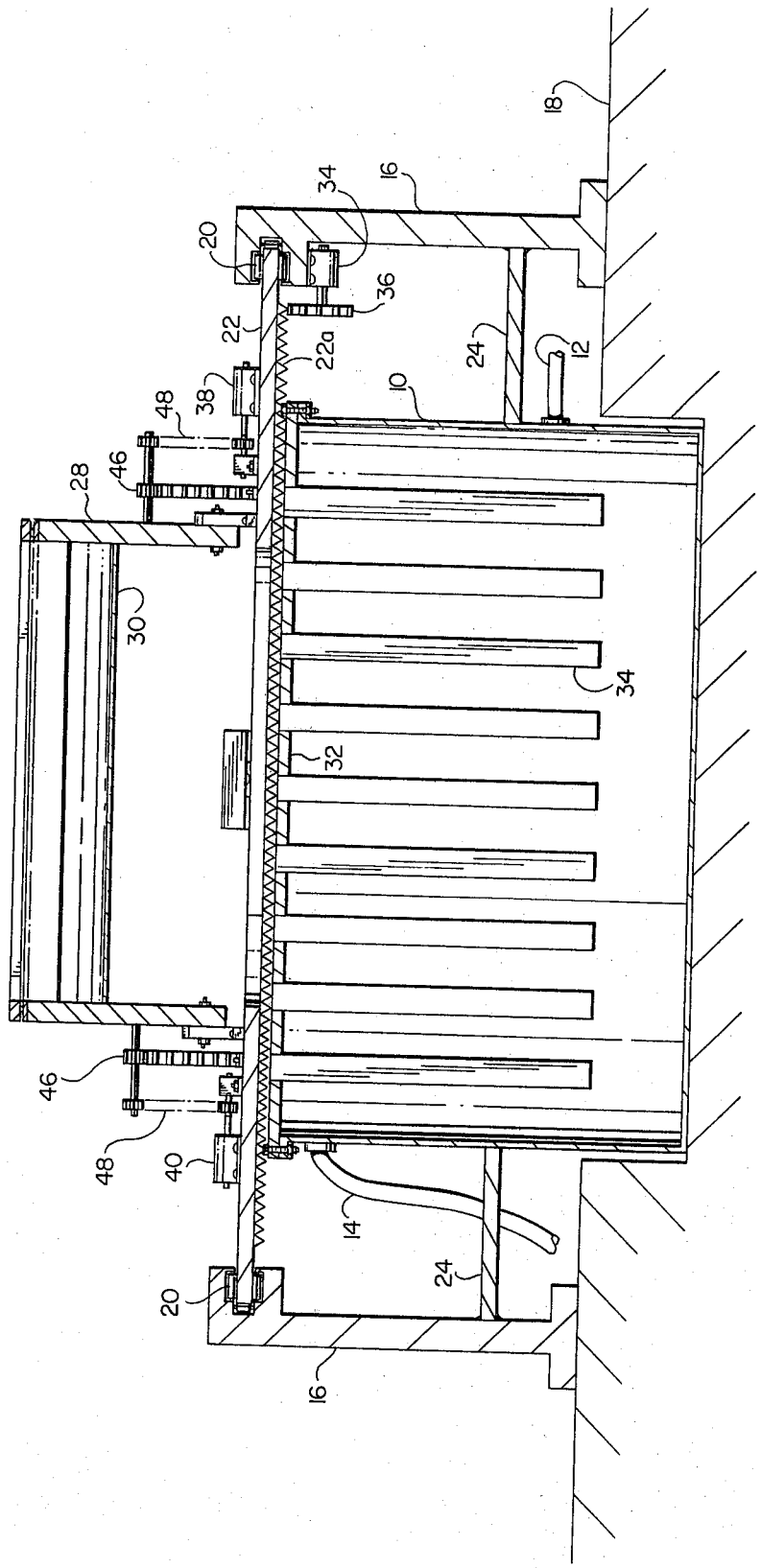
FIG. 2 is a sectional view taken generally on the line 2—2 of FIG. 1.

Turning now to the drawings in greater detail, FIG. 2 shows a generally cylindrical fluid storage tank 10 having fluid inlet and outlet conduits, 12 and 14 respectively, communicating with the interior of the tank so that fluid to be heated within the tank can be passed to from some sort of heat radiating device, such as a water heater or residential or commercial heating system (not shown). While water can be used as the heat retention/transfer fluid in the solar energy system to be described, it will be understood that the invention is not so limited, and that other fluids can be utilized as well.

A fixed frame is provided around the cylindrical storage tank 10, and said frame includes upright posts 16, 16 each of which has a lower end adapted to be supported on a floor 18 which floor may be above the level of the bottom of fluid storage tank 10 as best shown in FIG. 2. Adjacent the upper ends of these posts 16 bearing means 20 is provided in each of the posts 16 in order to rotatably support a movable frame 22 which includes a ring gear 22a. Horizontally extending struts 24, 24 are provided between the posts 16 and the outside of the tank 10 to further support the means 20. The movable frame 22 is supported for rotation coaxially with respect to the tank 10.

Figure 3:
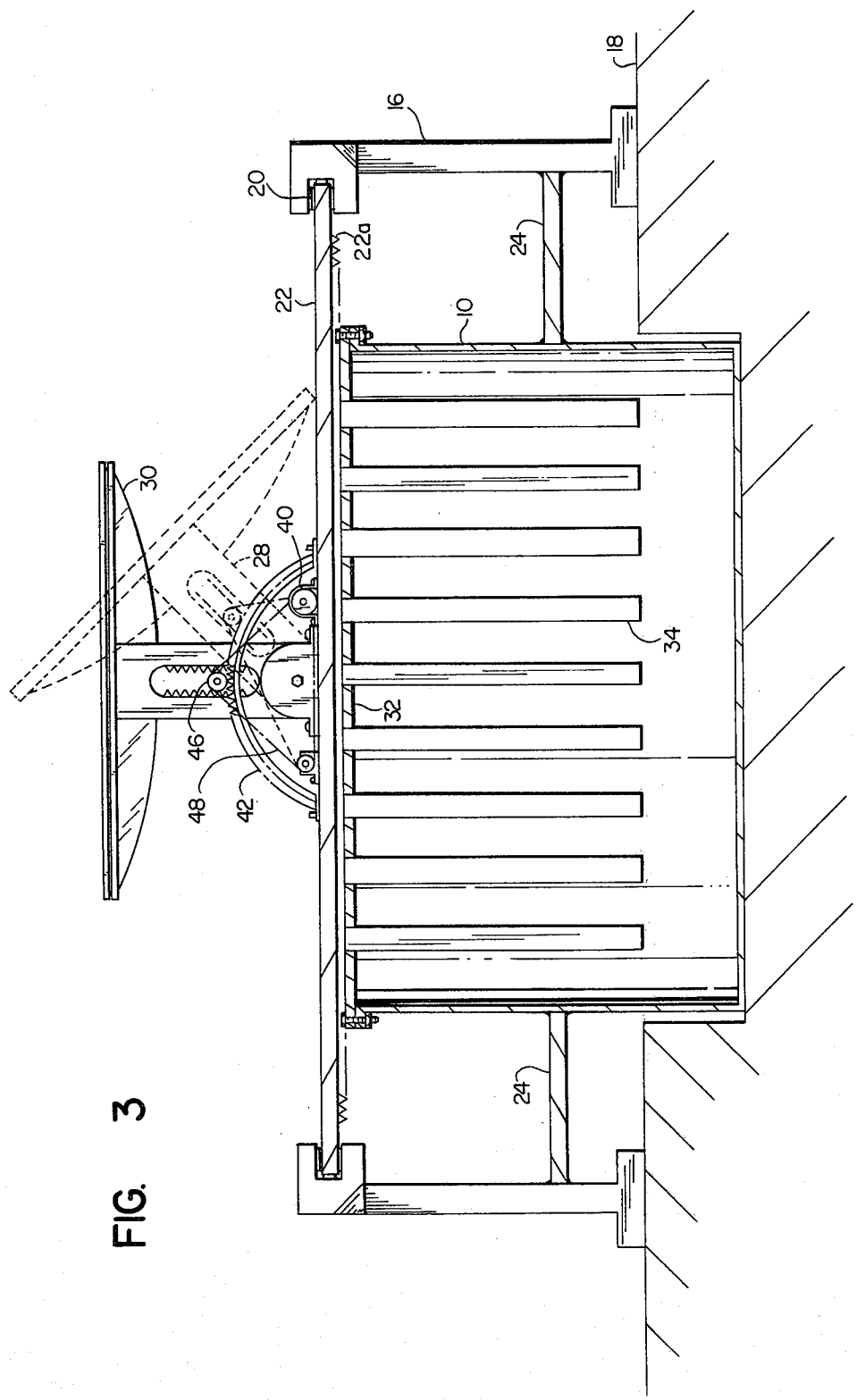
FIG. 3 is a sectional view taken generally on the line 3—3 of FIG. 1 with the solar energy focusing means being depicted in two positions in FIG. 3, one in solid lines and another in broken lines.

Lens means 30 is provided above the tank 10 and is mounted to the movable frame 22 by means of a yoke structure 28, which yoke structure 28 is supported in the movable frame 22 for movement therewith. More particularly, the yoke structure 28 is pivotally supported on the movable frame 22 for movement about a horizontal axis passing through, and oriented at right angles to, the generally vertical axis of the storage tank 10 and the movable frame structure 22. The relative motion between the yoke structure 28 and the frame 22 is best shown in FIG. 3 wherein the yoke structure 28 is there depicted in solid lines with the lens 30 oriented to receive solar energy from the sun at mid-day, and wherein the yoke structure 28 is also shown in broken lines in position for receiving the suns rays at early morning or late afternoon. The movable frame 22 has a central opening 22b such that the solar energy focused by the lens 30 will impinge directly onto the heat conductive top 32 of the tank 10. This top 32 has depending heat conductive elements 34 immersed in the fluid filled tank 10 so as to efficiently transfer the heat from the top 32 to the fluid in the tank 10.

Means is provided for moving the yoke structure 28, and also for moving the movable frame 22, so as to maintain the lens 30 in alignment with the sun throughout the day. The means for moving the movable frame 22 is illustrated at 34 in the form of a motor mounted to the post 16 and having a gear 36 adapted to mesh with the ring gear 22a for this purpose. The means for moving the yoke structure 28 relative to this movable frame 22 comprises a pair of synchronized drive motors 38 and 40 mounted to the movable frame 22 and connected by suitable drive means to the depending legs of the yoke structure 28 so as to achieve the oscillatory motion depicted for the lens structure 30 in FIG. 3. Laterally spaced support tracks 42 and 44 are provided on the movable frame 22 and define a path of movement for a pair of spur gears 46 associated with the drive means for the lens yoke structure 28. Each gear 46 comprises a follower journalled on a shaft which is driven by the drive motor 40 through the endless drive belt element 48.

Each of the support tracks 42 and 44 has an outer sector gear segment which meshes with each spur gear 46 and each belt 48 will drive its associated gear 46 as described above. The yoke structure 28 has slotted side arms which may include internal teeth along at least one side as best shown in FIG. 3. Each gear 46 is provided on a drive shaft such that the inner end of this shaft has an idler gear within one of these slots to mesh with these internal gear teeth. This configuration for the yoke drive means serves to support this yoke structure and lens 30 while they are being driven so as to track the sun during the day.

The motors 36, 38 and 40 are preferably driven so as to maintain the proper orientation for the lens 30 with respect to the position of the sun during a typical day when it is desired to store heat from the sun for any purpose. These drive motors can be programmed to follow any desired angular displacement for any particular day, or a sensor can be provided on the yoke structure for tracking the sun by means of a servo-loop or similar feedback system.

I claim:

1. A solar energy system comprising means defining a fluid storage tank and including fluid inlet and outlet conduits communicating with the said tank, a heat conductive top for said storage tank and including depending conductive elements connected to the underside of said top and adapted for immersion in the fluid filled tank, fixed frame means supporting a ring gear for rotation on a vertical axis which is located within said heat conductive top, a movable frame supported on said ring gear for rotation therewith and including a yoke structure pivotally supported on said ring gear for movement on a horizontal axis defined by said movable frame and said axis located in fixed relationship to said ring gear, lens means for focusing solar energy, said lens means mounted on said yoke structure and adapted to focus solar energy at said heat conductive fluid storage tank top, means for moving said yoke structure to permit said lens means to be aligned with the source of solar energy throughout the day, said yoke moving means including drive means mounted on said movable frame and said movable frame including parallel support tracks, a follower journalled on a shaft which is driven by said drive means and which follower engages said track to support said movable yoke structure and the lens means mounted therein.

2. The solar energy system of claim 1 wherein said drive means includes an endless drive element, a motor to drive said endless element, at least one of said support tracks including a gear sector, said follower comprising a spur gear driven by said endless element to mesh with said support track gear sector, and said follower further including a slot provided in a radial arm portion of said yoke structure.

* * * * *